United States Patent Office 2,993,885
Patented July 25, 1961

2,993,885
2-NAPHTHYLAZO PHENYLAMINE-4,6-DICHLOROTRIAZINES
Alfred Fasciati, Bottmingen, Switzerland, assignor to Ciba Limited, Basel, Switzerland
No Drawing. Filed June 27, 1957, Ser. No. 668,335
Claims priority, application Switzerland June 29, 1956
14 Claims. (Cl. 260—153)

This invention provides new, valuable monoazo dyestuffs containing a halogenated triazine radical. These new azo dyestuffs contain at least two acid water-solubilizing groups and correspond to the general formula (1)
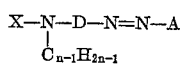

in which A indicates the radical of a hydroxy naphthalene sulfonic acid, especially a hydroxy naphthalene sulfonic acid containing an amino group, primarily an acylaminonaphthol sulfonic acid, $n$ is a positive whole number, preferably 1, X a dihalogentriazine radical of the formula

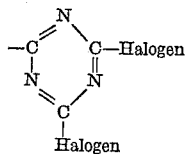

and D is a radical of the benzene series that is at the most bicyclic.

As acid water-solubilizing groups are concerned in this case strongly ionising water-solubilizing groups such as the carboxyl or sulfonic acid group. These groups can be distributed in the dyestuff molecule in any manner; two such groups can be present in one of the dyestuff components used for dyestuff formation, while the other dyestuff component is free from such groups, or both components may contain at least one carboxyl or sulfonic acid group.

In addition to at least two such groups, the dyestuffs of the Formula 1 contain a halogentriazine radical of the formula given above, preferably a dichlorotriazine radical of the formula

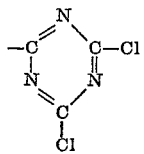

which is attached to the radical of the diazo component by way of a nitrogen bridge of the formula

which is attached either by way of an —SO$_2$— group or preferably directly to the diazo component. Such a diazo component containing the said halogentriazine radical can be prepared by known methods from 1 mol of cyanuric chloride and 1 mol of an aromatic compound of the benzene series containing together with a substituent of the formula

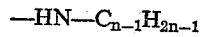

also a substituent convertible into an amino group, for example a nitro group, which after the reaction with cyanuric chloride is converted into an NH$_2$— group. On account of easier availability, however, the diazo components of this type obtainable from 1 mol of cyanuric chloride and 1 mol of an aromatic diamine of the benzene series are especially valuable. As aromatic diamines are concerned both bicyclic aromatic compounds of the benzene series and also, more preferably, monocyclic diamines.

The condensation of the specified aromatic compounds with cyanuric chloride is carried out advantageously in the presence of acid-binding agents such as sodium acetate or sodium carbonate. The condensation is to be carried out in such a manner that two of the three replaceable chlorine atoms remain in the condensation product produced, for example by working in weakly acid, neutral or weakly alkaline medium and/or at as low as possible a temperature.

As examples of amines thus obtainable, of which the diazo compounds are concerned as starting materials in the present process, the following may be mentioned:

The primary condensation products of 1 mol of cyanuric chloride with 1 mol of:

4:4'-diaminodiphenyl-3-sulfonic acid,
4:4'-diaminostilbene-2:2'-disulfonic acid,
4 - (4' - aminobenzoylamino) - 2 - aminobenzene - 1 - sulfonic acid,
4 - (4' - aminobenzoylamino) - 1 - aminobenzene - 2 - sulfonic acid,
4 - (3' - aminobenzoylamino) - 1 - aminobenzene - 2 - carboxylic acid,
1:3- or 1:4-diaminobenzene,
1:4-diaminobenzene-2-carboxylic acid,
1:3-diaminobenzene-4-sulfonic acid or 1:4-diaminobenzene-3-sulfonic acid or 2-methoxy-1:4-diaminobenzene-5-sulfonic acid.

For the manufacture of the dyestuffs of the Formula 1 according to the invention these primary condensation products are diazotized and coupled with hydroxynaphthalene sulfonic acids.

As hydroxynaphthalene sulfonic acids are concerned for example, 1-hydroxynaphthalene-3-, -4-, -5- or -8-sulfonic acid, 2-hydroxynaphthalene-4-, -5-, -6-, -7- or -8-sulfonic acid, 1:8-dihydroxynaphthalene-3:6disulfonic acid, 2:8-dihydroxynaphthalene-6-sulfonic acid, 2-hydroxynaphthalene-3:6- or -6:8-disulfonic acid, 1-hydroxynaphthalene-3:6- or 3:8-disulfonic acid, but especially aminonaphthol sulfonic acids such as 2-amino-8-hydroxynaphthalene-6-sulfonic acid, 2-amino-6-hydroxynaphthalene-8-sulfonic acid, 2-amino-5-hydroxynaphthalene-7-sulfonic acid, 2-phenylamino - 5-hydroxynaphthalene-7-sulfonic acid, 2-methylamino-8-hydroxynaphthalene-6-sulfonic acid, 2-phenylamino-5-hydroxynaphthalene-7-sulfonic acid, 1-amino-8-hydroxynaphthalene-4-sulfonic acid, 1-amino-8-hydroxynaphthalene-2:4-, -3:6- or -4:6-disulfonic acid and primarily the N-acyl derivatives of these aminonaphthol sulfonic acids. The acyl radical of these acylaminonaphthol sulfonic acids, which according to the present process lead to especially valuable products, can be an acetyl, propionyl, butyryl, chloracetyl, β-chloropropionyl, benzoyl, o-, m-, or p-chloro-benzoyl, nitrobenzoyl, tertiary butyl-benzoyl, 3'- or 4'-amino-benzoyl, methane or ethane sulfonyl, p-toluene sulfonyl or chlorobenzene sulfonyl radical; the carbomethoxy or the carbethoxy radical is also concerned or the acyl radical derived from cyanuric acid, for example a radical of the formula

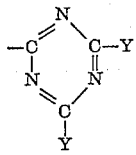

in which both symbols Y indicate halogen atoms, hydroxyl groups or amino groups, especially substituted amino groups.

In the selection of the diazo- and azo components to be used it is to be recommended only to couple such together as produce dyestuffs containing together with the halogen triazine radical at least two acid water-solubilizing groups.

The diazotization of the amines serving as starting materials in the present process can be carried out by methods of known type, for example using mineral acid, especially hydrochloric acid, and sodium nitrite. The coupling of the resulting diazo compounds with the specified hydroxynaphthalene sulfonic acids takes place under such conditions that the replaceable halogen present in the starting materials does not react, for example in a weakly acid medium or in a very weakly alkaline medium and at as low a temperature as possible.

A modification of the present process consists in that the specified triazine radical is not introduced into the diazo components serving as starting materials in the present process, but into the corresponding pre-formed azo dyestuffs containing in the radical of the diazo component a reactive hydrogen atom attached to a nitrogen atom and corresponding to the formula (3)

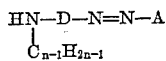

in which D and $n$ have the significance indicated in connection with Formula 1 and D and A together contain at least two water-solubilizing groups.

The dyestuffs of the Formula 3 can be prepared by methods of known type, for example from the hydroxynaphthalene sulfonic acids above specified by coupling with diazo compounds from monoacyl compounds of the diamines likewise specified for the preparation of the primary cyanuric chloride condensation products with hydrolysis of the monoacylamino-azodyestuffs produced.

The condensation of the pre-formed dyestuffs with cyanuric trihalides is likewise so conducted that only one of the three halogen atoms is replaced.

The introduction of the halogentriazine radical into the pre-formed dyestuffs is of especial advantage when it is desired to produce such dyestuffs as contain as azo component a hydroxynaphthalene sulfonic acid which couples in a relatively strongly alkaline medium. By this method of manufacture the danger is easily avoided, which strongly alkaline media constitute for the two remaining halogen atoms of the triazine ring, by carrying out the condensation with cyanuric chloride in a weakly acid or weakly alkaline medium after preparation of the dyestuff has taken place in a strongly alkaline medium if so desired.

The chlorotriazine dyestuffs prepared according to the present process and modified process can, if they still contain a reactive amino group, be condensed with a further mol of cyanuric chloride and in this manner dyestuffs produced which contain the characteristic halogentriazine grouping twice. From the reaction medium in which they are produced, the dyestuffs obtained according to the present process, in spite of the presence of labile halogen atoms, can be isolated for example by salting out and filtration and worked up to useful, dry dyestuff preparations. The isolation takes place preferably at as low a temperature as possible by salting out and filtration. The filtered dyestuffs, if desired after the addition of neutral or very weakly alkaline reacting color stretching agents or of buffer substances, for example after the addition of a mixture of equal parts of mono and dialkali phosphates, can be dried. The drying is preferably carried out at not too high a temperature, if desired under reduced pressure. In certain cases dry preparations can be obtained directly by spray drying of the whole reaction mixture containing the dyestuff, i.e. without intermediate isolation of the dyestuff as such.

By the present process and modified process new, valuable azodyestuffs are obtained which preferably contain at least two water-solubilizing groups and correspond to the general Formula 1.

The new dyestuffs are suitable for the dyeing and printing of a wide variety of materials, especially cellulosic materials of fibrous structure such as cellulose, linen, regenerated cellulose and primarily cotton. They are quite particularly suitable for dyeing by the so-called cold color process in which the dyeing is carried out at room temperature or at moderately elevated temperature in aqueous alkaline-reacting baths containing large quantities of salt. They are likewise suitable for dyeing by the printing and by the foulard method, according to which the dyestuff, applied to the goods to be dyed on the foulard using a dyestuff foulard solution, or by printing with a printing paste, is subjected to an alkali and if desired a heat treatment and in this manner fixed on the material to be dyed.

The dyeings obtainable with the new dyestuffs upon polyhydroxylated materials, especially on cellulosic textile materials are distinguished as a rule by the purity of their color shades, by a good fastness to light and primarily by outstanding fastness to washing.

The following examples illustrate the invention, the parts and percentages being by weight unless otherwise stated and the relation between part by weight and part by volume being the same as that between the kilogram and liter:

*Example 1*

33.6 parts of the primary condensation product from 1 mol of cyanuric chloride and 1 mol of 1:3-diaminobenzene-4-sulfonic acid are stirred in a mixture of 300 parts of water, 300 parts of ice and 20 parts of 30% hydrochloric acid and diazotization carried out at 0–2° C. with 25 parts by volume of 4N-sodium nitrite solution. The resulting diazo suspension, still acid to Congo red, is treated with 15 parts of sodium bicarbonate and then added to a solution, cooled to 0–2° C., of 42.3 parts of 1-benzoylamino-8-hydroxynaphthalene-3:6-disulfonic acid (in the form of the alkali salt) in 400 parts of water and 15 parts of calcined sodium carbonate. When the coupling is complete the dyestuff is separated by addition of potassium chloride, filtered, washed with potassium chloride solution and dried under vacuum at 30° C. It is easily soluble in cold water and dyes cellulose fibers at 25–35° C. from a bath alkaline with sodium carbonate and containing sodium chloride in pure bluish red shades which are remarkably fast to light and wet processing.

A somewhat less bluish red-dyeing dyestuff is obtained when the 1-benzoylamino-8-hydroxynaphthalene-3:6-disulfonic acid is replaced by the corresponding quantity of 1-(2'-chlorobenzoylamino)-8-hydroxynaphthalene-3:6-disulfonic acid.

By this method there are obtained from the primary condensation products of the formulae given in column I of the following table and the coupling components set forth in column II dyestuffs which dye cotton from a cold to luke warm bath in the shades set forth in column III.

| | I<br>Diazo component | II<br>Coupling component | III<br>Dyeing on cotton |
|---|---|---|---|
| 1 | Cl-triazine-NH-C₆H₃(SO₃H)(NH₂) | HO-naphthalene-SO₃H | orange. |
| 2 | Cl-triazine-NH-C₆H₃(SO₃H)(NH₂) | HO-naphthalene-(SO₃H)₂ | Do. |
| 3 | Cl-triazine-NH-C₆H₃(NH₂)(SO₃H) | HO, NH-CO-C₆H₁₁ naphthalene-(SO₃H)₂ | violet. |
| 4 | Cl-triazine-NH-C₆H₃(SO₃H)(NH₂) | HO, OCH₂CH₂OH naphthalene-(SO₃H)₂ | yellowish red. |
| 5 | Cl-triazine-NH-C₆H₃(SO₃H)(NH₂) | HO-naphthalene-(SO₃H)₂ | orange. |
| 6 | Cl-triazine-NH-C₆H₃(SO₃H)(NH₂) | HO-naphthalene-SO₃H | yellowish red. |
| 7 | Cl-triazine-NH-C₆H₃(SO₃H)(NH₂) | HO-naphthalene-Cl-SO₃H | Do. |
| 8 | Cl-triazine-NH-C₆H₃(SO₃H)(NH₂) | naphthalene-OH-CONH-C₆H₃(OCH₃)(SO₃H) | scarlet. |
| 9 | Cl-triazine-NH-C₆H₃(SO₃H)(NH₂) | HO, NH-C₆H₅ naphthalene-SO₃H | violet. |
| 10 | Cl-triazine-NH-C₆H₃(SO₃H)(NH₂) | HO-naphthalene-(SO₃H)-NHCO-NH₂ | orange. |

| | I<br>Diazo component | II<br>Coupling component | III<br>Dyeing on cotton |
|---|---|---|---|
| 11 | 2,4-dichloro-6-(4-sulfo-3-aminophenylamino)-triazine | 1-hydroxy-6-sulfo-2-(benzoylamino)-naphthalene | Do. |
| 12 | 2,4-dichloro-6-(4-sulfo-3-aminophenylamino)-triazine | 1-hydroxy-6-sulfo-2-(acetylamino)-naphthalene | yellowish red. |
| 13 | 2,4-dichloro-6-(4-sulfo-3-aminophenylamino)-triazine | 1-hydroxy-8-sulfo-5-(acetylamino)-naphthalene | bluish red. |
| 14 | 2,4-dichloro-6-(4-sulfo-3-aminophenylamino)-triazine | 1-hydroxy-3,6-disulfo-8-(4-methylphenylsulfonylamino)-naphthalene | Do. |
| 15 | 2,4-dichloro-6-(4-sulfo-3-aminophenylamino)-triazine | 1-hydroxy-3,6-disulfo-8-(4-aminobenzoylamino)-naphthalene | Do. |
| 16 | 2,4-dichloro-6-(4-sulfo-3-aminophenylamino)-triazine | 1-hydroxy-3,6-disulfo-8-(4-phenylbenzoylamino)-naphthalene | red. |
| 17 | 2,4-dichloro-6-(4-sulfo-3-aminophenylamino)-triazine | 1-hydroxy-3,6-disulfo-8-(2-phenylbenzothiazole-6-carbonylamino)-naphthalene | Do. |
| 18 | 2,4-dichloro-6-(4-sulfo-3-aminophenylamino)-triazine | 1-hydroxy-3,6-disulfo-8-(acetylamino)-naphthalene | pure red. |
| 19 | 2,4-dichloro-6-(4-sulfo-3-aminophenylamino)-triazine | 1-hydroxy-6-sulfo-8-(benzoylamino)-naphthalene | pure, somewhat bluish red. |

| | I<br>Diazo component | II<br>Coupling component | III<br>Dyeing on cotton |
|---|---|---|---|
| 20 | 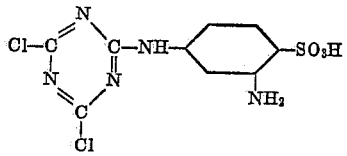 | 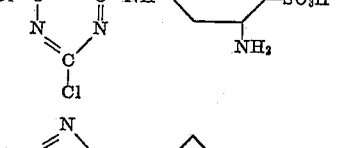 | yellowish red. |
| 21 | 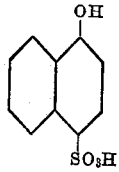 | 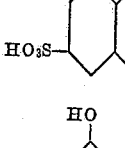 | red-orange. |
| 22 | 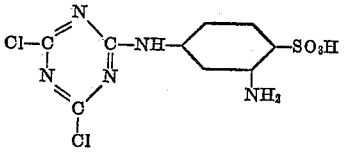 | 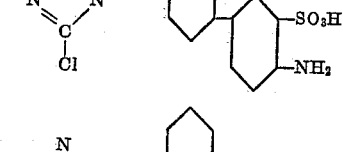 | very bluish red. |
| 23 | 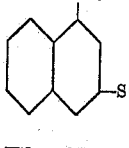 | 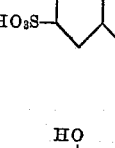 | pure red. |
| 24 | 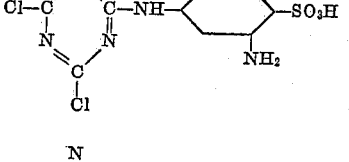 |  | blue-violet. |
| 25 | 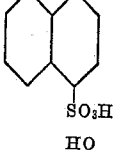 | 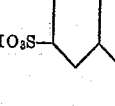 | violet. |

If dyestuff Number 15 of this table is condensed on the free $NH_2$—group with a further mol of cyanuric chloride, a very fast dyestuff is obtained having two dichlorotriazine residues.

Example 2

33.6 parts of the primary condensation product from 1 mol of cyanuric chloride and 1 mol of 1:4-diaminobenzene-3-sulfonic acid are stirred in a mixture of 300 parts of water, 300 parts of ice and 20 parts of 30% hydrochloric acid and diazotized at 0-2° C. with 25 parts by volume of 4N-sodium nitrite solution. The resulting diazo suspension, which is acid to Congo red, is treated with 15 parts of sodium bicarbonate and then at 0-2° C. added to a solution in 200 parts of water, acidified with acetic acid, of the sodium salt of 23.9 parts of 2-amino-8-hydroxynaphthalene-6-sulfonic acid. When the coupling is complete, the dyestuff is separated with sodium chloride, filtered and dried at room temperature. It dissolves in cold water with a bluish red color and dyes cellulose fibers from an alkaline bath in the presence of alkali chlorides or alkali sulfates at 25-35° C. in bluish red, fast shades.

A more yellowish red dyestuff is obtained by using diazo compounds of the amine of the formula

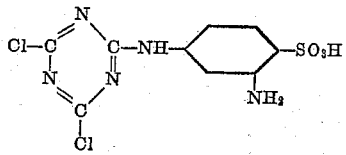

Example 3

42.3 parts of the aminoazo dyestuff of the formula

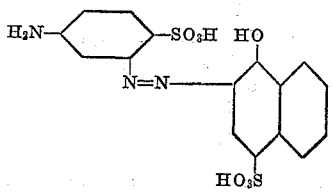

are dissolved in 1500 parts of water containing the calculated quantity of sodium carbonate. The neutral solution is run into an ice-cold, aqueous suspension of 18.4 parts of cyanuric chloride, and the mineral acid which forms if gradually neutralized by the addition of about 50 parts by volume of sodium carbonate solution. When the condensation is complete, the product is salted out, filtered, and dried at a moderate temperature. The dyestuff dyes cotton from an alkaline bath containing sodium chloride pure, yellowish-red tints.

*Example 4*

2 parts of the dyestuff obtained according to the first paragraph of Example 1 are dissolved cold in 2,000 parts of water. Into the resulting dye bath are entered at 20–30° C. 100 parts of well wetted cotton yarn; in the course of 30 minutes 500 parts of a 20% sodium chloride solution are added in portions and after a further 10 minutes 100 parts of a 10% sodium carbonate solution added. Dyeing is conducted for a further 60 minutes at 25–35° C. The resulting red dyeing is then rinsed with cold water, soaped at 80–100° C., thoroughly rinsed with cold water and dried. In this manner bluish red shades are obtained which are very fast to washing.

*Example 5*

2 parts of the dyestuff obtained according to paragraph 1 of Example 1 are dissolved in 4,000 parts of water and 100 parts of bleached soft cellulose introduced. The suspension is stirred for 1 hour at room temperature, 80 parts of sodium sulfate being added on two occasions after 5 and 15 minutes and after 30 minutes 40 parts of sodium carbonate being introduced.

The cellulose is filtered with suction on a filter plate, washed with hot water until the rinsing water is no longer colored, pressed out and dried. A full bluish red colored paper is obtained of very good fastness to light and wet processing.

An equally good result is obtained when the sodium carbonate is added at the commencement to the dyestuff solution.

*Example 6*

2 parts of the dyestuff obtained according to the first paragraph of Example 1 are dissolved in 100 parts of water.

A cotton fabric is impregnated with this solution at 40° C. on the foulard and the excess of liquid squeezed off so that the material retains 75% of its weight of dyestuff solution.

The goods thus impregnated are dried and then further impregnated at room temperature with a solution containing per liter 10 grams of sodium hydroxide and 300 grams of sodium chloride, squeezed out to a retention of 75% of liquid and steamed for 60 seconds at 100–101° C. The goods are then rinsed, treated in 0.5% sodium bicarbonate solution, rinsed, soaped at boiling temperature for a ¼ hour in an 0.3% solution of a non-ionic washing agent, rinsed and dried.

A bluish red dyeing fast to boiling results.

What is claimed is:

1. A water-soluble monoazo dyestuff containing at least two sulfonic acid groups and corresponding in its free acid state to the formula $$Cl-C{\underset{N}{\overset{N}{\diagdown}}}C-NH-D-N=N-A$$
$$\phantom{Cl-C}\underset{Cl}{\overset{\|}{C}}$$

in which A represents the radical of a hydroxynaphthalene sulfonic acid bound to the azo linkage in a position vicinal to the hydroxyl group, and D represents a benzene radical containing a sulfonic acid group.

2. A water-soluble monoazo dyestuff containing at least two sulfonic acid groups and corresponding in its free acid state to the formula $$Cl-C{\underset{N}{\overset{N}{\diagdown}}}C-NH-\bigcirc-N=N-A$$
$$\phantom{Cl-C}\underset{Cl}{\overset{\|}{C}}\quad SO_3H$$

in which A represents the radical of an acylamino naphtholsulfonic acid bound to the azo linkage in a position vicinal to the hydroxyl group.

3. A water-soluble monoazo dyestuff containing at least two sulfonic acid groups and corresponding in its free acid state to the formula $$Cl-C{\underset{N}{\overset{N}{\diagdown}}}C-NH-\bigcirc{\overset{SO_3H}{\underset{}{\phantom{|}}}}N=N-A$$
$$\phantom{Cl-C}\underset{Cl}{\overset{\|}{C}}$$

in which A represents the radical of an acylamino-α-naphtholsulfonic acid bound to the azo linkage in a position vicinal to the hydroxyl group.

4. A water-soluble monoazo dyestuff containing at least two sulfonic acid groups and corresponding in its free acid state to the formula $$Cl-C{\underset{N}{\overset{N}{\diagdown}}}C-NH-\bigcirc{\overset{SO_3H}{\underset{}{\phantom{|}}}}N=N-A$$
$$\phantom{Cl-C}\underset{Cl}{\overset{\|}{C}}$$

in which A represents the radical of an acylamino-α-naphtholsulfonic acid the acyl group of which is carboxylic acid acyl, the radical A being bound to the azo linkage in a position vicinal to the hydroxyl group.

5. A water-soluble monoazo dyestuff containing at least two sulfonic acid groups and corresponding in its free acid state to the formula $$Cl-C{\underset{N}{\overset{N}{\diagdown}}}C-NH-\bigcirc-N=N-A$$
$$\phantom{Cl-C}\underset{Cl}{\overset{\|}{C}}\quad -SO_3H$$

in which A in the radical of an acylamino-α-naphtholmonosulfonic acid the acyl group of which is carboxylic acid acyl, the radical A being bound to the azo linkage in a position vicinal to the hydroxyl group.

6. A water-soluble monoazo dyestuff containing at least two sulfonic acid groups and corresponding in its free acid state to the formula $$Cl-C{\underset{N}{\overset{N}{\diagdown}}}C-NH-\bigcirc-N=N-A$$
$$\phantom{Cl-C}\underset{Cl}{\overset{\|}{C}}\quad -SO_3H$$

in which A is the radical of an acylamino-α-naphtholdisulfonic acid the acyl group of which is carboxylic acid acyl, the radical A being bound to the azo linkage in a position vicinal to the hydroxyl group.

7. A water-soluble monoazo dyestuff containing at least two sulfonic acid groups and corresponding in its free acid state to the formula $$Cl-C{\underset{N}{\overset{N}{\diagdown}}}C-NH-\bigcirc-N=N-\bigcirc{\overset{HO}{\phantom{|}}}{\overset{NH-Y}{\phantom{|}}}$$
$$\phantom{Cl-C}\underset{Cl}{\overset{\|}{C}}\quad -SO_3H\quad HO_3S-\phantom{XX}-X$$
$$\phantom{XXXXXXXXXXXXXXXXXXXXX}X$$

in which one of the X's represents a hydrogen atom, the other X a sulfonic acid group, and Y the acyl radical of a member selected from the group consisting of lower aliphatic and benzene carboxylic acids.

8. A water-soluble monoazo dyestuff containing at least two sulfonic acid groups and corresponding in its free acid state to the formula

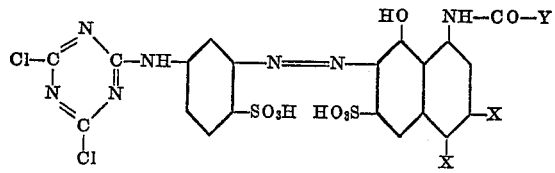

in which one of the X's represents a hydrogen atom, the other X a sulfonic acid group, and Y a benzene radical.

9. A monoazo dyestuff selected from the group consisting of the monoazo dyestuffs of the formulae:

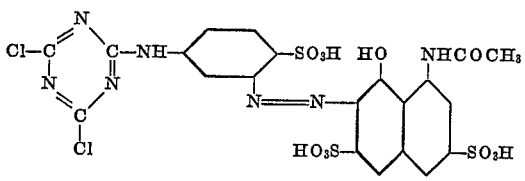

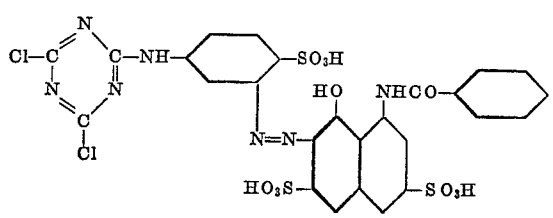

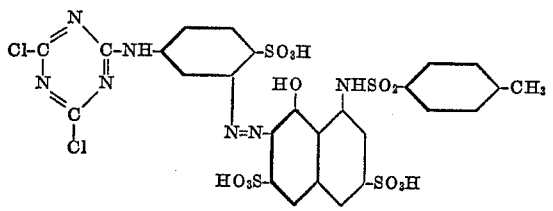

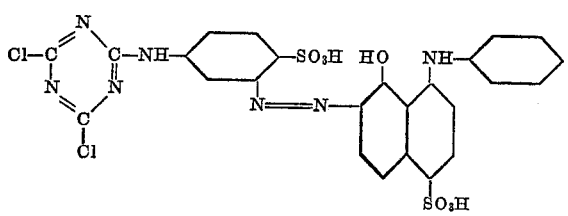

and

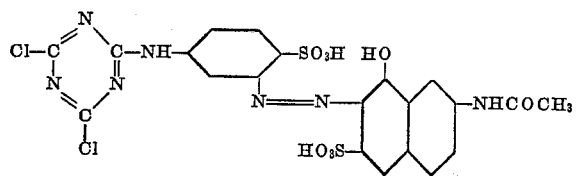

10. The monoazo dyestuff of the formula

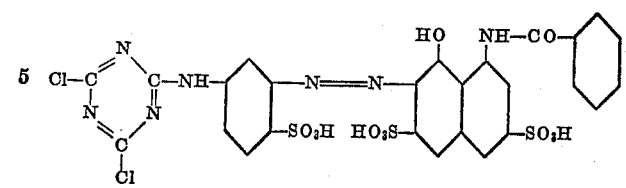

11. The monoazo dyestuff of the formula

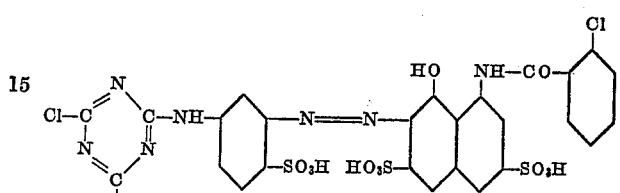

12. The monoazo dyestuff of the formula

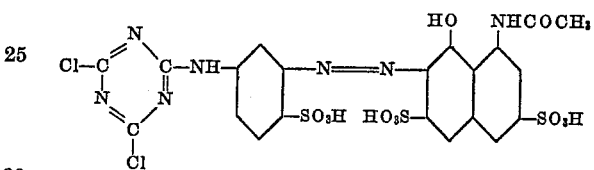

13. The monoazo dyestuff off the formula

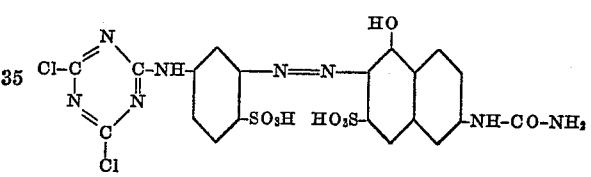

14. The monoazo dyestuff of the formula

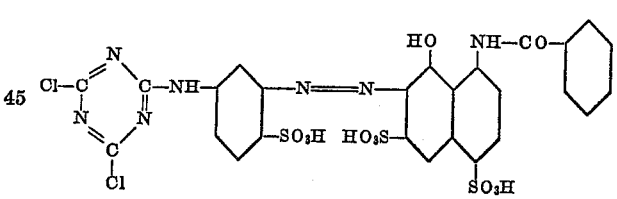

References Cited in the file of this patent

UNITED STATES PATENTS

| | | |
|---|---|---|
| 1,667,312 | Fritzsche et al. | Apr. 24, 1928 |
| 1,958,327 | Winkler | May 8, 1934 |
| 2,258,977 | Dickey et al. | Oct. 14, 1941 |

FOREIGN PATENTS

| | | |
|---|---|---|
| 198,059 | Switzerland | Aug. 16, 1938 |

OTHER REFERENCES

Boyle: The Industrial Chemist, August 1939, pages 331–333.

UNITED STATES PATENT OFFICE
CERTIFICATE OF CORRECTION

Patent No. 2,993,885                      July 25, 1961

Alfred Fasciati

It is hereby certified that error appears in the above numbered patent requiring correction and that the said Letters Patent should read as corrected below.

Columns 7 and 8, in the table, column 2 thereof and opposite item "13", the formula should appear as shown below instead of as in the patent:

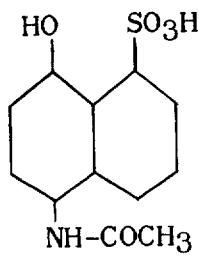

column 10, line 75, for "if" read -- is --.

Signed and sealed this 20th day of February 1962.

(SEAL)
Attest:

ERNEST W. SWIDER
Attesting Officer

DAVID L. LADD
Commissioner of Patents